(12) United States Patent
Hansson

(10) Patent No.: US 9,710,220 B2
(45) Date of Patent: Jul. 18, 2017

(54) CONTEXT-SENSITIVE MEDIA CLASSIFICATION

(71) Applicant: Sony Corporation, Tokyo (JP)

(72) Inventor: Emil Hansson, Malmö (SE)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 259 days.

(21) Appl. No.: 14/522,867

(22) Filed: Oct. 24, 2014

(65) Prior Publication Data

US 2016/0117143 A1    Apr. 28, 2016

(51) Int. Cl.
*G06F 17/00* (2006.01)
*G06F 3/16* (2006.01)
*G06F 17/30* (2006.01)
*G06Q 10/00* (2012.01)
*G05B 15/02* (2006.01)

(52) U.S. Cl.
CPC ............. *G06F 3/165* (2013.01); *G05B 15/02* (2013.01); *G06F 17/30026* (2013.01); *G06F 17/30749* (2013.01); *G06Q 10/00* (2013.01)

(58) Field of Classification Search
CPC ............... G06F 3/165; G06F 17/30026; G06F 17/30743; G06F 17/30749; G05B 15/02; G06Q 10/00; G10L 25/72; G10L 25/48; G10L 25/03
See application file for complete search history.

(56) References Cited

U.S. PATENT DOCUMENTS

| | | |
|---|---|---|
| 2005/0198061 A1 | 9/2005 | Robinson et al. |
| 2006/0106867 A1 | 5/2006 | Burges et al. |
| 2007/0296805 A1 | 12/2007 | Tedenvall et al. |
| 2009/0282111 A1 | 11/2009 | Jacobs et al. |
| 2010/0057781 A1 | 3/2010 | Stohr |
| 2012/0029670 A1* | 2/2012 | Mont-Reynaud . G06F 17/30743 700/94 |
| 2014/0274031 A1* | 9/2014 | Menendez ........ H04W 52/0209 455/426.1 |

OTHER PUBLICATIONS

International Search Report and Written Opinion; Jun. 29, 2015; issued in International Patent Application No. PCT/EP2015/058703.

* cited by examiner

*Primary Examiner* — Fan Tsang
*Assistant Examiner* — David Siegel
(74) *Attorney, Agent, or Firm* — James C. Edwards; Moore & Van Allen, PLLC

(57) ABSTRACT

Context data (230) is determined for an ambient media playback (110) in the surrounding of a user equipment. Based on the determined context data (230), identification data (240) for the ambient media playback (110) is determined.

19 Claims, 4 Drawing Sheets

CONTEXT-SENSITIVE MEDIA CLASSIFICATION

FIELD OF THE INVENTION

Various embodiments relate to a method of a user equipment determining identification data which identifies an ambient media playback in the surrounding of the user equipment and to a respective user equipment.

BACKGROUND OF THE INVENTION

A user equipment (UE) can be configured to determine identification data which identifies an ambient media playback in the surrounding of the UE. For this, the UE is typically configured to record an audio track, communicate with a server, and retrieve identification data for the ambient media playback based on the audio track.

However, such techniques typically require a significant amount of energy, i.e., energy consumption may be high. This may limit practical application where a battery capacity of the UE is comparably limited or where identification of the ambient media playback is desired over an extended period of time.

SUMMARY OF THE INVENTION

Therefore, a need exists to provide advanced techniques of determining identification data for an ambient media playback. In particular, a need exists to provide such techniques which allow determining of the identification data at comparably low energy consumption.

According to an exemplary embodiment, a method of a UE determining identification data which identifies an ambient media playback in a surrounding of the UE is provided. The method comprises at least one processor of the UE determining context data for the ambient media playback. The context data indicates at least one of a temporal context and a spatial context of the ambient media playback. The method further comprises, based on the determined context data, the at least one processor determining identification data for the ambient media playback.

Further exemplary embodiments relate to a UE which is configured to determine identification data which identifies an ambient media playback in the surrounding of a UE. The UE comprises at least one processor. The at least one processor is configured to determine context data for the ambient media playback. The context data indicates at least one of a temporal context and a spatial context of the ambient media playback. The at least one processor is further configured to determine the identification data for the ambient media playback based on the determined context data.

Further exemplary embodiments relate to a method of a UE determining identification data which identifies an ambient media playback in the surrounding of a UE. The method comprises at least one processor of the UE determining if a further UE is within the surrounding of the UE. The at least one processor receives, via a wireless interface of the UE, further identification data for at least one candidate media playback from the further UE. The at least one processor determines the identification data for the ambient media playback based on the further identification data for the candidate media playback.

Further exemplary embodiments relate to a UE which is configured to determine identification data which identifies an ambient media playback in the surrounding of the UE. The UE comprises at least one processor. The at least one processor is configured to determine if a further UE is within the surrounding of the UE. The at least one processor is further configured to receive, via wireless interface of the UE, further identification data for at least one candidate media playback from the further UE. The at least one processor is further configured to determine the identification data for the ambient media playback based on the further identification data for the candidate media playback.

DETAILED DESCRIPTION OF PREFERRED EMBODIMENTS

Figure 1:
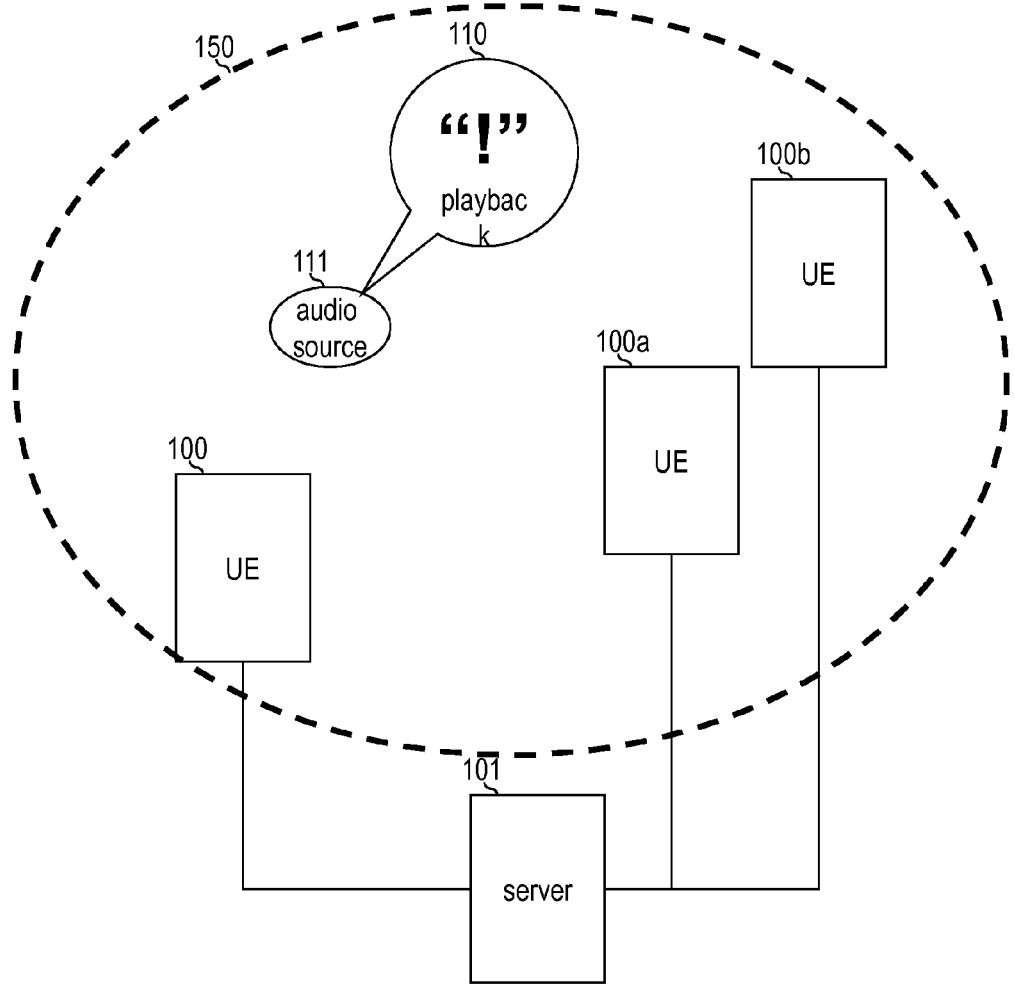
FIG. 1 schematically illustrates an ambient media playback in a surrounding of a UE.

In the following, exemplary embodiments of the invention will be described in more detail. It has to be understood that the features of the various exemplary embodiments described herein may be combined with each other unless specifically noted otherwise. Identical or similar reference numerals refer to identical or similar components.

Hereinafter, techniques of identifying an ambient media playback will be described. Various kinds and types of media may be subject to these techniques. Generally, media may relate to audio content and/or video content. Generally, the ambient media playback may relate to an audio playback, sounds from machines or robots, human speech, animal voices, a movie, music etc. For illustrative purposes, hereinafter reference is primarily made to the ambient media playback being an audio playback.

In the techniques of identifying the ambient media playback, music and other media may be identified from stream, e.g., an audio stream; the stream may be continuous. Such techniques are sometimes referred to as media classification, in particular to audio classification.

Media classification may find particular application in life-logging applications. In life-logging applications media classification of the ambient media playback is performed, e.g., for an extended period of time. The media classification may be executed by a UE. The UE may be a mobile device such as a mobile phone, a smartphone, a personal digital assistant, a mobile music player, a smart watch, a wearable electronic equipment, and a mobile computer. Such devices are portable and may be carried by a user.

In particular, hereinafter techniques of comparable energy-efficient media classification are described. These techniques are energy-efficient as they are aware of a context of the ambient media playback; in this sense, these techniques can be referred to as smart media classification.

The techniques rely on further resources relating to the context of the ambient media playback when executing the media classification. E.g., context data for the ambient media playback can be considered. The context data may indicate at least one of a temporal and a spatial context of the ambient media playback. When determining the context data, the context data may be received from a further entity, e.g., a server or a further UE. Alternatively or additionally, it is possible that the context data is retrieved from an internal memory of the UE or is determined based on input received from one or more sensors of the UE.

By taking into account the context data, it is possible to determine the identification data in a more energy-efficient manner: Certain procedures used in reference implementations of audio classification may be unnecessary—while still obtaining at least reasonably reliable results for the identification of the ambient media playback. E.g., the context data may allow estimating the outcome of the media classification to a certain degree; e.g., certain candidates for the identification of the ambient media playback may be found to be less probable, while other candidates for the outcome of the media classification may be found to be more probable. This information may be used to execute the media classification in a more energy-efficient manner.

The identification data may uniquely identify the ambient media playback. E.g., the identification data may indicate one or more of the following: a duration of the ambient media playback; a parameter of a frequency spectrum the ambient media playback; a tone of the ambient media playback; a speed the ambient media playback; a rhythm of the ambient media playback; a temporal evolution of the parameter of the frequency spectrum of the ambient media playback; a temporal evolution of the tone of the ambient media playback; a temporal evolution of the speed of the ambient media playback; a temporal evolution of the rhythm of the ambient media playback; an artist of the ambient media playback; an album of the ambient media playback; a title of the ambient media playback; a identification code of the ambient media playback. All such information may be used to uniquely and unambiguously identify the ambient media playback.

In FIG. 1 a scenario is shown where audio classification may be employed. In a proximity or surrounding 150 of a UE 100, an audio source 111 located. The surrounding 150 may correspond to the area where sound emitted from the audio source 111 can be still retrieved at the place of the UE 100; in particular, information included in the sound emitted from the audio source 111 can be retrieved, filtered out and understood at the place of the UE 100 and as long as the audio source 111 is within the surrounding 150. In general, the surrounding 150 may be predefined. E.g., the audio source 111 may be a radio, a TV, a live band, a loudspeaker, a person talking, or the like.

In general, there may be further audio sources in the surrounding 150 of the UE 100 (not shown in FIG. 1). Further, the UE 100 may move around such that over the course of time different audio sources are within the surrounding 150 of the UE 100.

An ambient media playback 110 originates from the audio source 111. The ambient media playback 110 may be prerecorded. and/or predefined The ambient media playback 110 may relate to one of a music track or other media such as a movie, an advertisement, a jingle, an audio book, etc. In particular, the ambient media playback 110 may be one of a series of media playbacks originating from the audio source 111.

Hereinafter, techniques are described which enable the UE 100 to identify the ambient media playback 110 in a lean and energy-efficient manner. For this, the UE 110 determines context data for the ambient media playback 110. The context data indicates at least one of a temporal context and a spatial context of the ambient media playback 110. Then, the UE 100 determines the identification data for the ambient media playback 110 based on the determined context data.

First, details of the spatial context according to various embodiments are provided. In FIG. 1, an exemplary spatial context of the ambient media playback 110 is illustrated. The spatial context of the ambient media playback 110, in the scenario of FIG. 1, is specified amongst others by further UEs 100a, 100b being located within the surrounding 150. E.g., the UE 100 may be configured to determine if the further UEs 100a, 100b are located within the surrounding 150 of the UE 100. Depending on the determining if the further UEs 100a, 100b are located within the surrounding, the UE 100 may receive, via a wireless interface (not shown in FIG. 1) of the UE 100, further identification data for at least one candidate media playback from the further UEs 100a, 100b. The context data may then be determined to comprise the further identification data retrieved from the further UEs 100a, 100b.

In general, various techniques are conceivable for determining if the further UEs 100a, 100b are located within the surrounding of the UE 100. E.g., this may be accomplished by a point-to-point communication between the UE 100 and the further UEs 100a, 100b. Such a communication is sometimes also referred to as device-to-device (D2D) communication. For this purpose, a wireless interface selected from the group comprising a wireless local area network (WLAN), Bluetooth, Near Field Communication (NFC) may be employed. E.g., position data indicating a position of the UE 100 and/or the further UEs 100a, 100b may be exchanged between the UE 100 and the further UEs 100a, 100b. Alternatively or additionally, it is also possible that a server 101 is employed in order to determine whether the further UEs 100a, 100b are located within the surrounding 150 of the UE 100. Communication between the UE 100 and the further UEs 100a, 100b with the server 101 may be accomplished via the Internet. The UE 100 and/or the further UEs 100a, 100b may access the Internet employing a radio access technology of a cellular network and/or employing WLAN and/or employing a fixed-line connection, e.g., according to the Digital Subscriber Line (DSL) standard.

E.g., the server 101 may store position data for the UE 100 and the further UEs 100a, 100b and, by comparing the position data for the UE 100 with the position data of the further UEs 100a, 100b, may determine that the UE 100 and the further UEs 100a, 100b are located within the surrounding 150. Then, respective control data may be signalled to the UE 100 and/or the further UEs 100a, 100b.

In a similar manner, it is possible that the UE 100 receives the further identification data directly from at least one of the further UEs 100a, 100b, e.g., employing the D2D communication. Alternatively or additionally, it is also possible that the further identification data is signalled via the server 101.

E.g., the further UEs 100a, 100b may each execute a full-scale audio classification of the ambient media playback 110. E.g., each one of the further UEs 100a, 100b may record an audio track which relates to at least a fraction of the ambient media playback 110, determine meta data for the track, the meta data indicating at least one of a temporal characteristic and a frequency characteristic of the audio track, send the meta data to the server 101, and receive the further identification data from the server 101.

E.g., if the ambient media playback includes visual content, it might be possible to rely additionally or alternatively on a movie track. For this, a camera or image detector of the UEs 100a, 100b may record image data of the movie track. For sake of simplicity, hereinafter, reference is made to audio classification; however, respective techniques may be readily applied to other types of media.

It is then possible that the UE 100 piggy-backs on the audio classification executed by the further UEs 100a, 100b. In such scenarios, it is possible that the UE 100 uses the further identification data as the identification data for the ambient media playback. I.e., the UE 100 may directly employ the further identification data received from the at least one of the UEs 110a, 100b as the identification data for the ambient media playback. This is because under certain conditions it may be sufficiently likely that the identification data obtained, e.g., from audio classification executed by the further UEs 100a, 100b correctly identifies the ambient media playback 110.

It is also possible to further validate the further identification data received from the further UEs 100a, 100b. This validation may occur in various forms.

In one scenario, if the further identification data received from the further UE 100a is the same or matches with the further identification data received from the further UE 100b, it can be assumed that the further identification data correctly identifies the ambient media playback 110. In this case, the UE 100 may determine the identification data as the further identification data received from, both, the further UEs 100a, 100b. In general, if consistent further identification data is received from a plurality of further UEs 100a, 100b the identification data may be determined as the further identification data received from the plurality of further UEs 100a, 100b.

Figure 2:
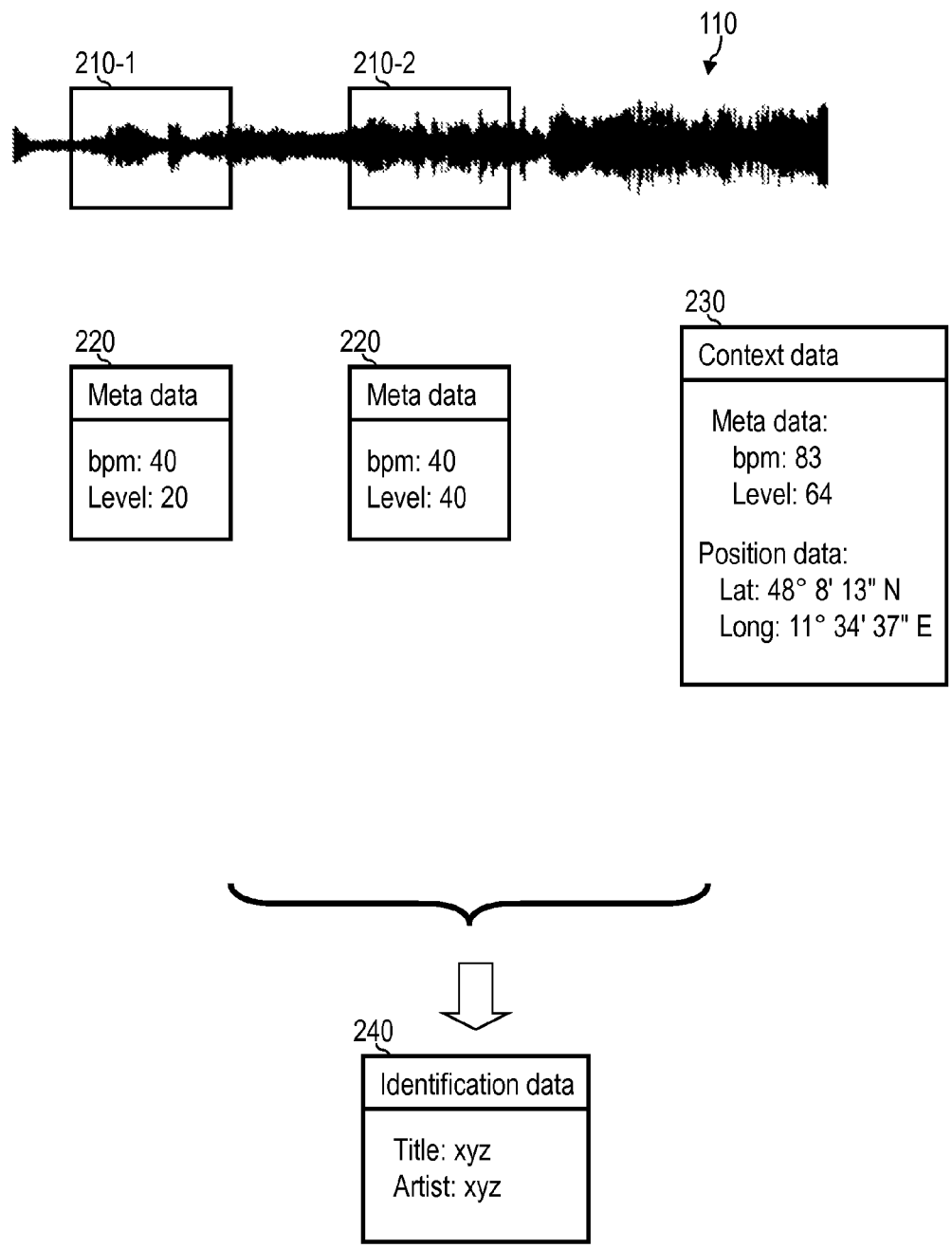
FIG. 2 schematically illustrates audio tracks relating to a fraction of the ambient media playback, meta data indicating a temporal and a frequency characteristic of the at least one audio track, context data relating to a spatial context of the ambient media playback, and identification data identifying the ambient media playback according to various embodiments.

Alternatively or additionally, other techniques of validating the further identification data may be employed by the UE 100. This is explained with reference to FIG. 2. In FIG. 2, a temporal evolution of an amplitude of the ambient media playback 110 at the location of the UE 100 is illustrated (FIG. 2, upper part). An audio detector of the UE 100 records two audio tracks 210-1, 210-2. The two audio tracks 210-1, 210-2 relate to a fraction of the ambient media playback 110. Based on the audio tracks 210-1, 210-2, the meta data 220 for the ambient media playback 110 is determined. The meta data 220 may indicate at least one of a temporal characteristic and a frequency characteristic of the audio tracks 210-1, 210-2. In the scenario of FIG. 2, the meta data 220 indicates a beats-per-minute (bpm) value and an audio level.

While in the scenario of FIG. 2, two audio tracks 210-1, 210-2 are shown, in general a larger or smaller number of audio tracks 210-1, 210-2 may be employed in the audio classification.

While in FIG. 2, the audio tracks 210-1, 210-2, it is also possible that—alternatively or additionally to the audio tracks 210-1, 210-2—movie tracks are relied upon. This may enable media classification of other types and kinds of media than audio.

In the scenario of FIG. 2, the UE 100 receives meta data for the at least one candidate media playback as the context data 230 from the further UEs 100a, 100b (shown in FIG. 2, right side). It is then possible that the UE 100 compares the meta data for the at least one candidate media playback with the meta data 220 determined for the audio tracks 210-1, 210-2. It is possible to take into account the result of this comparing when determining identification data 240 for the ambient media playback 110. The identification data 240, in the scenario of FIG. 2, indicates a title of the ambient media playback 110 and an artist performing the ambient media playback 110.

The determining of the identification data 240 for the ambient media playback 110 may then comprise: depending on the comparing of the meta data for the at least one candidate media playback with the meta data determined for the at least one audio track, selectively using the further identification data for the at least one candidate media playback as the identification data 240 for the ambient media playback 110.

In general, such techniques as mentioned above which involve comparing of meta data 220 may involve a comparably coarse analysis of the ambient media playback 110 based on the temporal characteristic and the frequency characteristic of the audio track 210-1, 210-2. Here it is assumed that the audio track 210-1, 210-2 recorded by the UE 100 includes significant information which allows extracting a fingerprint of the ambient media playback 110 as the meta data 220. It is then possible to consider the context data 230 by comparing the meta data for the candidate media playback included in the context data 230 with the meta data 220 determined by the UE 100 for the ambient media playback 110. If the fingerprints match, it may be assumed that the further identification data for the candidate media playback also correctly identifies the ambient media playback 110.

Figure 3:
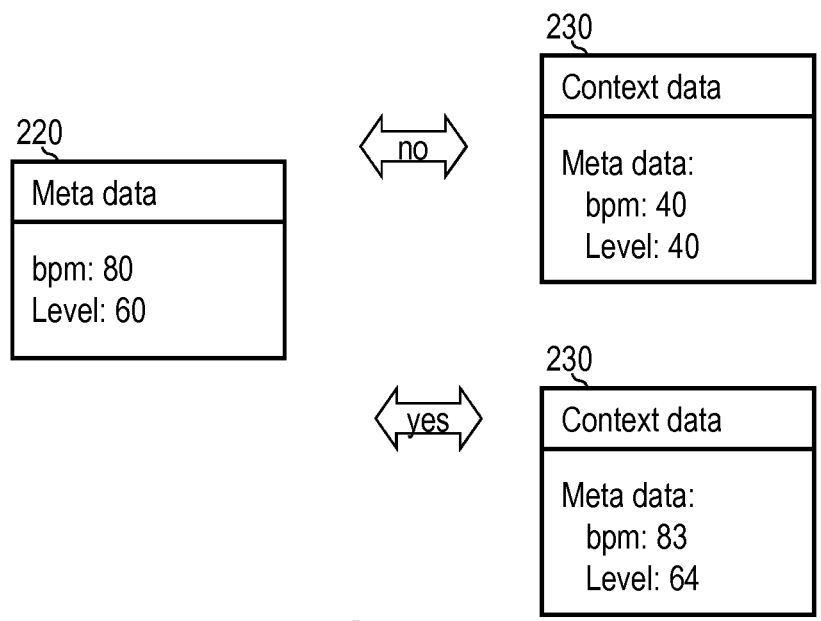
FIG. 3 schematically illustrates comparing of meta data with context data.

Such techniques of comparing the meta data for the candidate media playback with meta data determined by the UE 100 directly for the ambient media playback 110 are illustrated in FIG. 3. In FIG. 3, left side, the meta data 220 determined by the UE 100 for the ambient media playback 110 is shown. In FIG. 3, right hand side, the context data 230 for two candidate media playbacks is shown. The context data 230 includes the respective meta data for the respective candidate media playback. Both, the meta data 220 for the ambient media playback 110, as well as the meta data for the candidate media playbacks include the bpm value as a frequency characteristic and the amplitude level; i.e., the meta data for the ambient media playback 110 and the meta data for the candidate media playback include corresponding information on the frequency characteristic and the temporal characteristic of the respective media playback.

As can be seen from FIG. 3, the meta data of one of the two candidate media playbacks matches better with the meta data 220 for the ambient media playback 110. Therefore, it can be assumed that it is the better-matching meta data which also corresponds to the ambient media playback 110. There may be further identification data available which identifies the candidate media playback for the better-matching meta data. Then, said further identification data may be used as the identification data for the ambient media playback 110.

In general, both, the context data 230 as well as the further identification data may be received by the UE 100 via D2D communication from the further UEs 100a, 100b. In such a scenario it is not necessary to contact the server 101 in order to determine the identification data for the ambient media playback 110. Rather, by employing the context data 230 which includes the meta data for various candidate media playbacks, it is possible to identify the particular one of the candidate media playbacks which is most likely to relate to the ambient media playback 110; for this candidate media playback, the further identification data may be used as the identification data for the ambient media playback 110.

Above, a scenario has been illustrated where the context data 230 includes the meta data for the candidate media playback; this meta data may be considered to be a characteristic fingerprint of the candidate media playback.

Yet, it is also possible that—alternatively or additionally to including the meta data in the context data 230—the further UEs 100a, 100b provide at least one further audio track recorded by an audio detector of the respective further UEs 100a, 100b. In other words, the raw data underlying the characteristic fingerprint of the meta data for the candidate media playback may be provided.

E.g., the UE 100 may be configured to receive, via the wireless interface, at least one further audio track from the further UE 100a, 100b. This may occur by D2D communication and/or via the server 101. The at least one further audio track may relate to at least a fraction of the candidate media playback. The context data 230 may then comprise the at least one further audio track.

The UE 100 can be configured to determine meta data for the candidate based on the received at least one further audio track. The meta data may indicate at least one of a temporal characteristic and a frequency characteristic of the candidate media playback. Then, it is possible to compare the meta data for the candidate media playback with the meta data for the ambient media playback 110; here, techniques as illustrated above with respect to FIG. 3 may be employed. In such a scenario, the logic for determining the meta data for the candidate media playback has been shifted from the further UEs 100a, 100b to the UE 100.

Alternatively or additionally, it is also possible to consider the further audio track as relating to the ambient media playback 110 in the first place. Here, the meta data 220 for the ambient media playback 110 may be determined based on the at least one further audio track and optionally based on the audio tracks 210-1, 210-2 recorded by the audio detector of the UE 100. I.e., it may be directly considered that the at least one further audio track, as well as the audio tracks 210-1, 210-2 recorded by the audio detector correspond to one and the same playback.

Such techniques rely on the finding that, by utilizing audio detectors of a plurality of UEs 100, 100a, 100b, a better accuracy can be reached when executing the audio classification. This is because a better audio quality relying on a higher information depth may be achieved. It can also be easier to segment the audio tracks in order to remove noise and other irrelevant audio when relying on the audio tracks recorded by a plurality of UEs 100, 100a, 100b which are all located within the surrounding 150. E.g., to this respect techniques such as microphone triangulation can be employed.

In various embodiments the spatial context of the ambient media playback 110 is alternatively or additionally specified by a certain position of the audio source 110 and the UE 100. This is also illustrated in FIG. 2. In the scenario of FIG. 2, the context data 230 also includes position data in the form of latitude and longitude values which relate to a position of the UE 100. The position data may serve as an indication of a position of the audio source 111 which is located in the surrounding 150 of the UE 100.

E.g., the position data included in the context data 230 may be obtained from a positioning unit of the UE 100 such as a Global Positioning System (GPS) receiver or the like. It is then possible that the determining of the identification data 240 takes into account the current position of the UE 110 indicated by the context data 230.

There are various scenarios conceivable how the current position of the UE 100 can be taken into account when determining the identification data 240. In one scenario, it is possible that the UE 100 retrieves, from a database, meta data for at least one candidate media playback depending on the current position. Again, the meta data can indicate at least one of a temporal characteristic and a frequency characteristic of the respective candidate media playback. It is then possible that the meta data for the at least one candidate media playback is compared with the meta data 220 determined for the audio tracks 210-1, 210-2 recorded by the audio detector of the UE 100.

Such a scenario relies on the finding that for certain positions the ambient media playback 110 is likely to correspond to the candidate media playback. E.g., there may be certain locations where playback for one and the same piece of audio is executed in a reoccurring manner. This may be the case for jingles which mark a certain location, e.g., at stations of a public transit system or the like.

In general, the above-mentioned database linking the position of the UE 100 with the meta data for the at least one candidate media playback may be a remote database stored on the server 101. It is also possible that the database is available offline to the UE 100, i.e., is a local database stored in an internal memory of the UE 100. E.g., it is possible that the UE 100, via the wireless interface of the UE, downloads the database from the server 101 to the internal memory of the UE 100 prior to said retrieving of the meta data for the at least one candidate media playback from the database. Then, the meta data may be retrieved from the data base stored in the internal memory when executing the audio classification.

It is also possible that the UE 100 retrieves, from the database, further identification data for the at least one candidate media playback. The context data 230 can then comprise the further identification data. The determining of the identification data 240 for the ambient media playback 110 may further comprise: depending on the comparing of the meta data for the at least one candidate media playback with the meta data 220 determined for the audio tracks 210-1, 210-2, selectively using the further identification data for the at least one candidate media playback as the identification data 240 for the ambient media playback 110. E.g., if the meta data for the at least one candidate media playback matches well with the meta data 220 determined for the audio tracks 210-1, 210-2, it is possible that the further identification data is used as the identification data 240 for the ambient media playback 110. In particular, in such a scenario it may be assumed that it is very likely that the further identification data correctly identifies the ambient media playback 110.

Above, techniques have been primarily discussed where the context data 230 relates to a spatial context of the ambient media playback 110. Here, it has been discussed the context data 230 may relate to at least one of a further audio track recorded by an audio detector of the further UE 100a, 100b, meta data for a candidate playback and/or further identification data for the candidate media playback, as well as to a current position of the UE 100. E.g., it is possible that the UE 100 receives, from the further UE 100a, 100b, the at least one further audio track recorded by an audio detector a the further UE 100a, 100b and that the determining of the identification data 240 of the ambient media playback 110 is based on the further audio track. E.g., it is possible that the UE 100 receives the meta data for the candidate media playback from the further UE 100a, 100b and that the determining of the identification data 240 of the ambient media playback 110 is based on the meta data for the candidate media playback. E.g., it is possible that the UE 100 receives the further identification data for the candidate media playback from the further UE 100a, 100b and that the determining of the identification data 240 of the ambient media playback 110 is based on the further identification data of the candidate media playback. E.g., it is possible the UE 100 determines a current position of the UE 100 and receives, from the database, further identification data for at least one candidate media playback depending on the current position; the determining of the identification data 240 of the ambient media playback 110 may be based on the further identification data.

Figure 4:
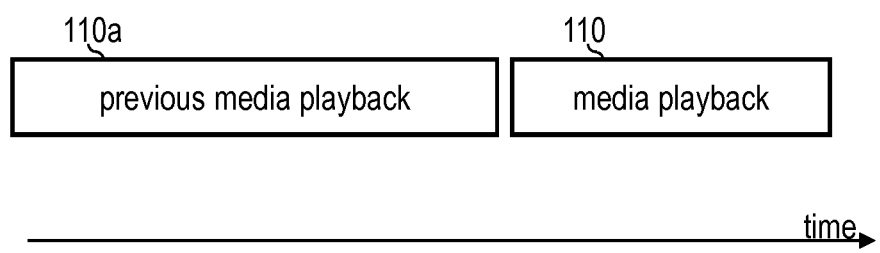
FIG. 4 schematically illustrates a temporal context of the ambient media playback.

The context data 230—alternatively or additionally to the spatial context—may relate to a temporal context of the ambient media playback 110. This is illustrated in FIG. 4. Here, the ambient media playback 110 is preceded by a previously identified media playback 110a. In other words, audio classification may have been successfully employed to identify the previously identified media playback 110a.

It is possible that the context data 230 includes meta data for a previously identified media playback 110a. E.g., the meta data for the previously identified media playback 110a may indicate a duration of previously identified media playback 110a. It is then possible that the UE 100 monitors that the previously identified media playback 110a is still ongoing based on at least the duration of the previously identified media playback 110a and the current time. The determining of the identification data 240 or for the ambient media playback 110 may be executed when the monitoring yields that the previously identified media playback 110a is not ongoing.

I.e., until the previously identified media playback 110a ends, there may be no need to execute audio classification in order to identify the ambient media playback 110. In other words, the audio classification for identifying the ambient media playback 110 may commence in a synchronized manner with the starting time of the ambient media playback 110; therefore, executing audio classification multiple times for one and the same ambient media playback 110 may be avoided. This allows reducing the required energy resources.

Halting the audio classification until the previously identified media playback 110a has ended can occur in various ways. In one scenario, the UE 100 may halt all activities related to the audio classification, including the recording of audio tracks, the determining of the meta data 220 based on the audio tracks 210-1, 210-2, as well as the determining of the identification data 240 based on the meta data 220. In a further scenario, the UE 100 may halt only some of these activities, e.g., those activities which have a comparably high energy consumption and/or those activities which are not needed to validate if the previously identified media playback 110a is still ongoing.

E.g., even when taking into account and estimated end time of the previously identified media playback 110a based on its duration, it may be desirable to validate if the previously identified media playback 110a is still ongoing. In this regard, the UE 100 may commence recording the audio tracks 210-1, 210-2 for the ambient media playback 110 and may further commence determining the meta data 220. The monitoring may comprise comparing the meta data for the previously identified media playback 110a with the meta data 220 determined for the audio tracks 210-1, 210-2 recorded by the audio detector of the UE 100. For this comparing, techniques as illustrated above with respect to FIG. 3 may be employed.

Based on said comparing, it is possible to validate if the previously identified media playback 110a is still ongoing. In particular, by such techniques an unexpected early ending of the previously media playback 110a—not properly reflected by the duration indicated by the meta data for the previously identified media playback—may be taken into account. E.g., when the comparison of the meta data 220 for the ambient media playback 110 with the meta data of the previously identified media playback 110a yields a significant deviation of the bpm value, it is possible that the determining of the identification data 240 for the ambient media playback 110, i.e., the audio classification, commences.

Figure 5:
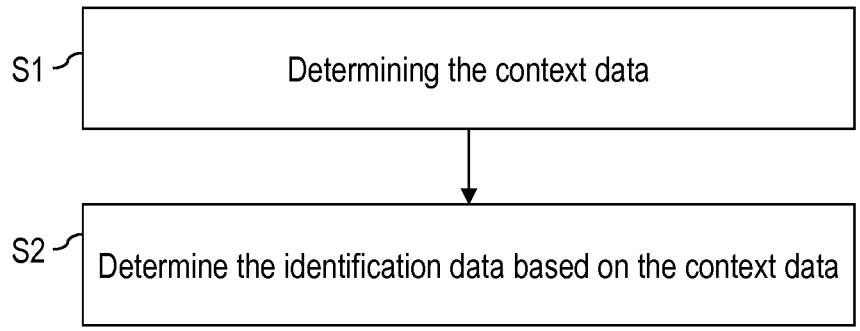
FIG. 5 is a flowchart of a method of determining identification data according to various embodiments.

In FIG. 5, a flowchart of a method according to various embodiments is shown. At S1, the context data 230 is determined. The context data 230 specifies at least one of a temporal characteristic and a spatial characteristic of the ambient media playback 110.

To this end, the context data 230 may include various information. E.g., the context data 230 can include meta data for a previously identified ambient media playback 110a as a temporal context. The meta data for the previously identified ambient media playback 110a may have been determined in the course of a previous audio classification executed by the UE 100. It is then possible to halt audio classification until the previously identified media playback 110a has ended and is not ongoing anymore. In some scenarios, core functionality of the audio classification commences while the previously identified media playback 110a is assumed to be ongoing, such as the determining of the meta data 220 for the audio tracks 210-1, 210-2. In particular, an expected bpm-value of the previously identified media playback 110a may be constantly compared with the bpm-value of the meta data 220 determined based on the audio tracks 210-1, 210-2. Then, if a significant deviation occurs, it may be concluded that the previously identified media playback 110a has ended.

The context data 230 of S1 can also include a spatial context, e.g., further audio tracks of a further UE 110a, 110b, meta data for a candidate media playback which is received from at least one of a further UE 110a, 110b located in the surrounding 150 of the UE 100 and a server 101 based on a current position of the UE 100, and/or further identification data for the candidate media playback.

At S2, the identification data 240 is established taking into account the context data 230 of S1. E.g., the context data 230 can be taken into account at S2 by executing S2 when the context data 230 indicates that the previously identified media playback 110a is not ongoing.

At S2, the method may further comprise recording the audio tracks 210-1, 210-2 which relate to a fraction of the ambient media playback 110; and determining the meta data 220 for the ambient media playback 110 may be based on the audio tracks 210-1, 210-2. Further, the method may comprise sending, via the wireless interface of the UE 100, the determined meta data 220 for the ambient media playback 110 to the server 101; and receiving, from the server 101, the identification data 240 for the ambient media playback 110. As can be seen, in such a scenario an audio classification according to reference implementations is selectively triggered based on the context data 230.

E.g., the context data 230 can alternatively or additionally be taken into account at S2 by using further identification data for a candidate media playback as the identification data 240 for the ambient media playback 110; here, the further identification data may be received from the server 101 and/or from the further UEs 100a, 100b.

Figure 6:
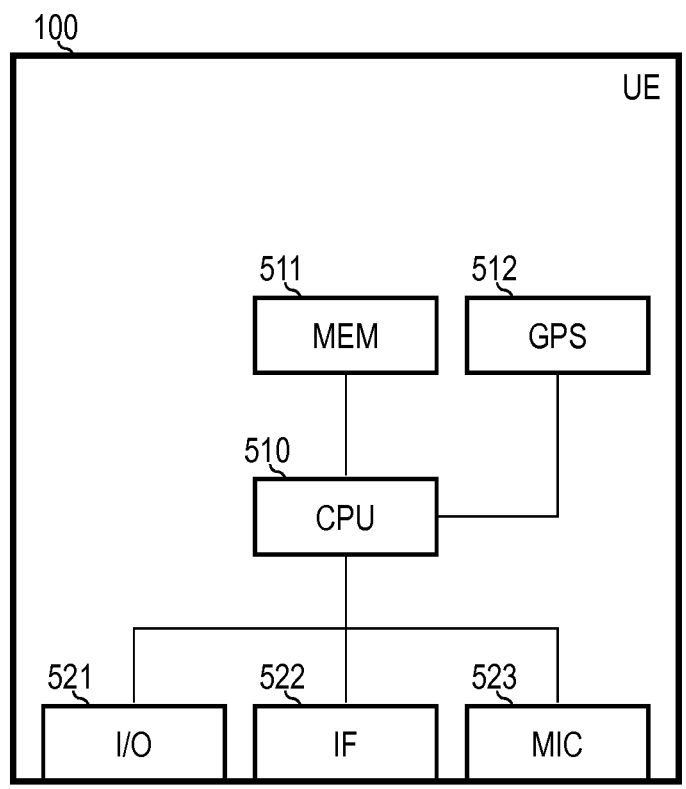
FIG. 6 is a schematic representation of the UE.

In FIG. 6, the UE 100 is shown at greater detail. The UE 100 comprises a processor 510 and an internal memory 511. The internal memory 511 can be a volatile or non-volatile memory. The internal memory 511 includes control instructions which, when executed by the processor 510, cause the processor 510 to execute techniques as have been described above with respect to the audio classification. In particular, the control instructions can instruct the processor 510 to execute techniques relating to the determining of the context data 230, the determining of the meta data 220, and/or the determining or the identification data 240.

Further, the UE 100 comprises a GPS receiver 512. The GPS receiver 512 may be employed to determine a current position of the UE 100. In particular, the processor 510 can be configured to determine the context data 230 taking into account the current position as determined by the GPS receiver 512.

Further, the UE 100 comprises a wireless interface 522. The wireless interface 522 is configured to establish a wireless communication with further UEs 100a, 100b which are located in the surrounding 150 of the UE 100. This wireless communication can be established employing D2D technology. For this purpose, wireless communication protocols such as WLAN, NFC, and/or Bluetooth may be employed.

Alternatively or additionally, the wireless interface 522 can be configured to establish a wireless connection via a radio interface of a cellular network. Data may be exchanged with the server 101.

Further, the UE 100 comprises a microphone 523 as an audio detector. The microphone 523 is configured to record the audio tracks 210-1, 210-2, which relate to at least fractions of the ambient media playback 110. Based on the audio tracks 210-1, 210-2 the processor 510 is configured to determine the meta data 220. The UE 100 may further comprise a camera as a movie detector (not shown in FIG. 6). By this, the movie tracks may be recorded. Media classification of other kinds and types of media becomes possible.

The UE 100 further comprises a user interface 521. The user interface 521 can comprise various entities, such as, but not limited to: a display, a touch-sensitive display, buttons, audio output, control lights, etc. Via the user interface 521 it is possible to receive user input which controls at least parts of the techniques as mentioned above in connection with the audio classification. Further, it is possible to output a result of the audio classification to a user.

As will be appreciated, above techniques have been illustrated which enable to execute audio classification in a lean, accurate, and energy-efficient manner. E.g., it may be avoided that the same audio classification is done twice: it is possible to re-use audio classification of nearby further UEs and to halt audio analysis until it is expected that a previously identified media playback has ended. The accuracy of the audio classification can be increased by taking into account audio tracks and/or meta data determined based on the audio tracks for candidate media playbacks. E.g., this information may be received from a further UE in the surrounding of the UE and/or a server.

Although the invention has been shown and described with respect to certain preferred embodiments, equivalents and modifications will occur to others skilled in the art upon the reading and understanding of the specification. The present invention includes all such equivalents and modifications and is limited only by the scope of the appended claims.

For example, while above reference has been primarily made to scenarios where the ambient media playback relates to an audio playback, the respective techniques may be readily applied to other kinds and types of media playback, such as a movie, speech, sounds from machines/robots, animal voices, etc. Here, alternatively or additionally to audio tracks, it is possible to rely on other media tracks such as movie tracks, etc.

The invention claimed is:

1. A method of a user equipment determining identification data which identifies an ambient media playback in a surrounding of the user equipment, the method comprising:
   at least one processor of the user equipment determining context data for the ambient media playback, the context data comprising a current position of the user equipment and indicating at least one of a temporal context and a spatial context of the ambient media playback,
   based on the determined context data, the at least one processor determining the identification data for the ambient media playback by:
      retrieving, from a database, meta data for at least one candidate media playback depending on the current position, the meta data indicating at least one of a temporal characteristic and a frequency characteristic of the respective candidate media playback, and
      comparing the meta data for the at least one candidate media playback with meta data determined for at least one media track recorded by a media detector of the user equipment, said meta data indicating at least one of a temporal characteristic and a frequency characteristic of the at least one media track.

2. The method of claim 1, further comprising:
   a media detector of the user equipment recording at least one media track, the at least one media track relating to at least a fraction of the ambient media playback,
   the at least one processor determining meta data for the ambient media playback based on the at least one media track, said meta data indicating at least one of a temporal characteristic and a frequency characteristic of the at least one media track,
   wherein the determining of the identification data is based on the determined meta data for the ambient media playback.

3. The method of claim 1,
   wherein the context data comprises meta data for a previously identified media playback, said meta data indicating at least one of a temporal characteristic and a frequency characteristic of the previously identified media playback.

4. The method of claim 3,
   wherein the meta data for the previously identified media playback indicates a duration of the previously identified media playback,
   wherein the method further comprises:
      monitoring if the previously identified media playback is still ongoing based on at least the duration of the previously identified media playback and a current time,
   wherein the determining of the identification data for the ambient media playback is executed when the monitoring yields that the previously identified media playback is not ongoing.

5. The method of claim 4,
   wherein the monitoring comprises: comparing the meta data for the previously identified media playback with meta data determined for at least one media track recorded by a media detector of the user equipment, said meta data indicating at least one of a temporal characteristic and a frequency characteristic of the at least one media track.

6. The method of claim 1, further comprising:
the at least one processor retrieving, from the database, further identification data for the at least one candidate media playback,
wherein the context data comprises the further identification data,
wherein the determining of the identification data for the ambient media playback comprises: depending on the comparing of the meta data for the at least one candidate media playback with the meta data determined for the at least one media track, selectively using the further identification data for the at least one candidate media playback as the identification data for the ambient media playback.

7. The method of claim 1, further comprising:
the at least one processor, via a wireless interface of the user equipment, off-loading the database of the meta data for the at least one candidate media playback from at least one server to an internal memory of the user equipment prior to said retrieving of the meta data for the at least one candidate media playback from the database,
wherein the meta data is retrieved from the database stored in the internal memory.

8. The method of claim 1, further comprising:
the at least one processor determining if a further user equipment is located within the surrounding of the user equipment,
depending on the determining if the further user equipment is located within the surrounding, the at least one processor selectively receiving, via a wireless interface of the user equipment, further identification data for at least one candidate media playback from the further user equipment,
wherein the context data comprises the further identification data.

9. The method of claim 8, further comprising:
depending on the determining if the further user equipment is located within the surrounding, the at least one processor selectively receiving, via the wireless interface, meta data for the at least one candidate media playback from the further user equipment,
comparing the meta data for the at least one candidate media playback with meta data determined for at least one media track recorded by a media detector of the user equipment, said meta data indicating at least one of a temporal characteristic and a frequency characteristic of the at least one media track,
wherein the determining of the identification data for the ambient media playback comprises: depending on the comparing of the meta data for the at least one candidate media playback with the meta data determined for the at least one media track, selectively using the further identification data for the at least one candidate media playback as the identification data for the ambient media playback.

10. The method of claim 8, further comprising:
wherein the determining of the identification data for the ambient media playback comprises: using the further identification data for the at least one candidate media playback as the identification data for the ambient media playback.

11. The method of claim 1, further comprising:
the at least one processor receiving, via a wireless interface of the user equipment, at least one further media track from a further user equipment, the at least one further media track relating to at least a fraction of the at least one candidate media playback,
wherein the context data comprises the at least one further media track,
the at least one processor determining meta data for the ambient media playback based on the received at least one further media track, said meta data indicating at least one of a temporal characteristic and a frequency characteristic of the ambient media playback,
wherein the determining of the identification data is based on the determined meta data for the ambient media playback.

12. The method of claim 2,
wherein the determining of the identification data comprises:
the at least one processor sending, via a wireless interface of the user equipment, the determined meta data for the ambient media playback to at least one server,
retrieving, from the at least one server, the identification data for the ambient media playback.

13. The method of claim 1,
wherein the determining of the context data comprises:
retrieving the context data from an internal memory of the user equipment.

14. A user equipment configured to determine identification data which identifies an ambient media playback in a surrounding of the user equipment,
the user equipment comprising:
at least one processor configured to determine context data for the ambient media playback, the context data comprising a current position of the user equipment and indicating at least one of a temporal context and a spatial context of the ambient media playback,
wherein the at least one processor is further configured to determine the identification data for the ambient media playback based on the determined context data by (i) retrieving, from a database, meta data for at least one candidate media playback depending on the current position, the meta data indicating at least one of a temporal characteristic and a frequency characteristic of the respective candidate media playback and (ii) comparing the meta data for the at least one candidate media playback with meta data determined for at least one media track recorded by a media detector of the user equipment, said meta data indicating at least one of a temporal characteristic and a frequency characteristic of the at least one media track.

15. The user equipment of claim 14, further comprising:
a media detector configured to record at least one media track, the at least one media track relating to at least a fraction of the ambient media playback,
wherein the at least one processor is configured to determine meta data for the ambient media playback based on the at least one media track, said meta data indicating at least one of a temporal characteristic and a frequency characteristic of the at least one media track,
wherein the processor is configured to determine the identification data based on the determined meta data for the ambient media playback.

16. The user equipment of claim 14,
wherein the context data comprises meta data for a previously identified media playback, said meta data indicating at least one of a temporal characteristic and a frequency characteristic of the previously identified media playback.

17. The user equipment of claim 14,
wherein the at least one processor is configured to determine if a further user equipment is located within the surrounding of the user equipment,
wherein the at least one processor is further configured, depending on the determining if the further user equipment is located within the surrounding, to selectively receive, via a wireless interface of the user equipment, further identification data for at least one candidate media playback from the further user equipment,
wherein the context data comprises the further identification data.

18. The user equipment of claim 14,
wherein the at least one processor is configured to receive, via a wireless interface of the user equipment, at least one further media track from a further user equipment, the at least one further media track relating to at least a fraction of the at least one candidate media playback,
wherein the context data comprises the at least one further media track,
wherein the at least one processor is configured to determine meta data for the ambient media playback based on the received at least one further media track, said meta data indicating at least one of a temporal characteristic and a frequency characteristic of the ambient media playback,
wherein the at least one processor is configured to determine the identification data based on the determined meta data for the ambient media playback.

19. The user equipment of claim 14,
wherein the user equipment is a mobile device of a group comprising a mobile phone, a smartphone, a personal digital assistant, a mobile music player, a smart watch, a wearable electronic equipment, and a mobile computer.

* * * * *